(12) United States Patent
Massay

(10) Patent No.: US 11,895,959 B2
(45) Date of Patent: Feb. 13, 2024

(54) SCALABLE AND RE-CONFIGURABLE SYSTEM FOR INDOOR GROWING

(71) Applicant: Brandon Massay, Ann Arbor, MI (US)

(72) Inventor: Brandon Massay, Ann Arbor, MI (US)

(\*) Notice: Subject to any disclaimer, the term of this patent is extended or adjusted under 35 U.S.C. 154(b) by 0 days.

(21) Appl. No.: 17/358,400

(22) Filed: Jun. 25, 2021

(65) Prior Publication Data
US 2022/0408659 A1 Dec. 29, 2022

(51) Int. Cl.
*A01G 9/12* (2006.01)
*A01G 9/24* (2006.01)
*A01G 9/14* (2006.01)
*A01G 9/02* (2018.01)
*A01G 9/04* (2006.01)

(52) U.S. Cl.
CPC .............. *A01G 9/247* (2013.01); *A01G 9/12* (2013.01); *A01G 9/027* (2013.01); *A01G 9/047* (2013.01); *A01G 9/143* (2013.01)

(58) Field of Classification Search
CPC . A01G 9/247; A01G 9/02; A01G 9/12; A01G 9/027; A01G 9/047; A01G 9/143; A01G 17/04; A01G 17/06; A01G 9/26
See application file for complete search history.

(56) References Cited

U.S. PATENT DOCUMENTS

| | | | |
|---|---|---|---|
| 10,888,054 B2* | 1/2021 | Storey | A01G 31/02 |
| 10,993,383 B2* | 5/2021 | Petrovffsky | A01G 9/246 |
| 2008/0313960 A1* | 12/2008 | Norvitch | A01G 9/02 47/79 |
| 2022/0369570 A1* | 11/2022 | Lord | A01G 9/12 |

\* cited by examiner

*Primary Examiner* — Monica L Perry
*Assistant Examiner* — Megan J Moroney
(74) *Attorney, Agent, or Firm* — Heed Law Group PLLC; Thomas Heed

(57) ABSTRACT

The present invention is a scalable and re-configurable system for indoor growing. The scalable and re-configurable system for indoor growing is comprised of a plurality of growing sleds, in which each growing sled has a plurality of plant stations. Plants are grown in receptacles on each plant station. The plant station is rotated by a drive system. Each plant station provides irrigation. Each plant station has a forced frame connected to the top of a plant support assembly. A forced frame is used to confine each plant to a known foot-print. This is necessary in indoor growing in order to make the production uniform and efficient.

25 Claims, 16 Drawing Sheets

SCALABLE AND RE-CONFIGURABLE SYSTEM FOR INDOOR GROWING

FIELD OF INVENTION

This invention relates to the classification of horticulture; and to one or more sub-classifications under cultivation in receptacles, forcing-frames or greenhouses. Specifically, this invention is a scalable and re-configurable system growing marketable plants indoors.

BACKGROUND OF INVENTION

There will be almost 10 billion humans on planet Earth by the year 2050. In order to feed all those additional mouths, food production will have to increase by 70%. Since people are largely farming all of the arable land, this means that the existing land will have to substantially increase its yield, or that we will have to find other ways to farm.

In the United States, agriculture has converged towards ever-larger farms which provide raw materials to industrial-sized food processors. Whether the farms are called factory farms or industrial farms, the scope of modern American farms is breath-taking. According to "Farms and Land in Farms" published by the National Agricultural Statistics Service published at the U. S. D. A., the average farm size in the U.S. was 444 acres or about 70% of a square mile. But that doesn't really tell the whole story. Of those farms with over $250,000 in sales in 2019, the average farm size was 2085 acres, or 3.25 sq. miles. These farms account for more than 55% of the farming acreage in the United States.

Industrial farming has resulted in a push to maximize yield, through seed hybridization, watering, crop rotation, crop layout, and pesticide use. Modern farm machinery is increasingly GPS-enabled with automated machine control. In other words, much of the possible yield improvements have already been made at industrial farms. Extracting an additional 70% increase in yields from the same land is going to be difficult.

Additionally, arable land is also being used for non-comestibles such as green energy, bio-degradable plastics, and marijuana. The demand for arable land for non-comestible agriculture exacerbates the population-related pressures for additional arable land for food production.

Part of the potential solution to meeting future market needs is the large and growing number of farms that have moved indoors in urban settings. Space in urban settings is often available in the form of vacant factories and warehouses. Urban farms are also desirable, because the food is produced near the consumer. Indoor farms often have higher yields than traditional farming methods because crops can be grown in three dimensions and water, lights, and nutrients can be closely controlled. According to a July 2020 article by Forbes, the indoor agriculture technology market was valued at $23.75 billion in 2016, and is projected to reach $40.25 billion by 2022. This indicates a large and growing interest in indoor farming.

There are at least three remaining kinks to indoor growing technology. First, producers have to custom configure their growing racks, irrigation, and lighting for each new building. Vacant warehouses and factories do not typically have a uniform layout. Additionally, many of the older building have inconveniently located support beams. Creating a custom configuration for each new building slows the growth of indoor farming. Some have tried to overcome this problem by standardizing indoor growing in a standard 40-foot shipping container. This solution is limited by the dystopian implications of proliferating 40-foot shipping containers in an urban setting.

The second problem is that indoor farms can only allot a limited amount of floor space to growing. People need to tend to and harvest the plants, and therefore need access to the plants. As a result, the percentage of floor space that is actually used for urban growing is sub-optimal.

The third problem is one of yield. Outdoors, plants are presented the sun and the wind from various angles. Indoors growers try to present light from all sides in the belief that this will cause the plant to grow optimally. A growing body of evidence is showing that plants actually need to experience light from different angles.

The indoor agriculture technology market needs a scalable and re-configurable system to lower the cost of set-up, increase the percentage of space that can be used to grow plants, and present plants with light from different angles.

SUMMARY OF THE INVENTION

This summary is intended to disclose the present invention, a scalable and re-configurable system for indoor growing. The embodiments and descriptions are used to illustrate the invention and its utility, and are not intended to limit the invention or its use.

The scalable and re-configurable system for indoor growing is comprised of a plurality of growing sleds, in which each growing sled has a plurality of plant stations. In the embodiments illustrated in the detailed description, there are three or four plant stations per sled, but that number can vary depending on the length of the sled and the size of the plant. Each plant station has a forced frame connected to the top of a plant support assembly. A forced frame is used to confine each plant to a known foot-print. This is necessary in indoor growing in order to make the production uniform and efficient.

The forced frame is comprised of a plurality of forced frame vertical members and a rim assembly. In the embodiments illustrated herein, there are four forced frame vertical members per plant station. The number of forced frame vertical members depends on the size and shape of the plants grown. The rim assembly is comprised of an upper retaining rim, two spokes, four retention clips, and a center piece. The upper retaining rim being the upper most element of the scalable and re-configurable system for indoor growing. The retaining rim has two intersecting spokes, which are designed to provide the retaining rim with structural rigidity without blocking the ability of a plant to grow through the upper retaining rim. The two spokes are joined at their intersection by the center piece, which just holds the spoke together. The upper retaining rim, intersecting spokes, and forced frame vertical members are connected to one another with retention clips. The forced frame vertical members are hollow and have a generally cylindrical surface. The portion of the surface that faces outwards has a plurality of horizontal slits. The portion of the surface that faces inwards has a small hole at the top, a small hole at the bottom, and at least one larger hole at the approximate mid-point. Two cross members attach opposing pairs of forced frame vertical members, at the approximate mid-point of the forced frame vertical member's height. The cross members fit into the larger holes in the forced frame vertical members. The two cross-members add structural rigidity without confining a plant within the forced frame. A filament wraps around the forced frame vertical members, to confine the plant within the forced frame. The filament begins and ends at one of the smaller holes positioned at the top and bottom of the forced frame vertical members. The filament is inserted into the small hole in the hollow forced frame vertical member and is knotted. The knot secures the filament to the forced frame vertical member. The filament is then wrapped around the outside of the forced frame vertical members. The filament is captured in the horizontal slots.

The forced frame is attached to the plant support assembly at the plant-support plate, the surface upon which a plant in a receptacle will rest. A base plate underneath the plant-support plate provides spacing for the attachment with the forced frame. Starting at the bottom, each plant support assembly is comprised of an attachment plate, which attaches the plant support assembly to the growing sled; a two-piece rotational bearing; a lower spacer plate; a plant-support drive wheel; an upper spacer plate; the base plate; and the plant-support plate. The plant-support drive wheel has a lower rim, an upper rim, and a drive cylinder. The lower rim and the upper rim keep the closed-loop drive belt centered on the drive cylinder. Many of the structural elements of the plant support assembly have central through holes: the attachment plate; the two-piece rotational bearing; the lower spacer plate; the plant-support drive wheel; and the upper spacer plate. The two-piece rotational bearing and the plant-support drive wheel are both annuli. The other structural elements of the plant support assembly are typically square plates.

The plant-support plate is square plate, with a through-hole in each of the four corners. Threaded fasteners are fed through the corner holes in the plant-support plate, with the shank facing upward. A washer is disposed between the head of the threaded fastener and the bottom surface of the plant-support plate. The threaded fastener is fixed to the plant-support plate with a capture nut, which is tightened until the head of the threaded fastener and washer are tight against the bottom surface of the plant-support plate.

The upward facing shanks are used to connect the plant support assembly to the forced frame. The forced frame is connected to the plant support assembly by attaching the forced frame vertical members to the upward-extending fastener shanks protruding from the top of the plant-support plate. The forced frame vertical members fit over the shanks protruding upward in each corner of the plant-support plate.

The plant support assembly is designed to facilitate irrigation through a plurality of hoses segments and connectors. For the most part, the hose connectors are elbows, which are used to change the hose direction without kinking the hose, or restricting its flow. A first length of irrigation hose extends through the through holes in the attachment plate, the two-piece rotational bearing, the lower spacer plate, and the plant-support drive wheel to the upper spacer plate of each of the plurality of plant support assemblies. A hose elbow connects to one end of the first length of hose and nests into a grove formed in the upper spacer plate. The other end of the first length of irrigation hose is connected to a connector at a common feed hose. A second length of hose nests into the grove of the upper spacer plate and mates with the elbow at one end of the second length of hose. The other end of the second length of hose terminates at a c-shaped nozzle housing, which houses a nozzle. Thereby, water is delivered to each of the plurality of plant stations on each of the plurality of sleds.

The plant support assembly mates to the growing sled at two u-channels mounted to the frame of the growing sled. The frame of each sled is rectangular. The sled has two rectangular end side arrangements and two longitudinal members. Each u-channel has two ends. One end of each u-channel is attached to an upper transverse member of a first end side of the sled. A second end of each u-channel is attached to an upper transverse member of a second end side of the sled. The two u-channels are parallel to one another.

In the embodiments illustrated herein, the frame is comprised of two rectangular end side arrangements and two longitudinal members. Each of the two rectangular end side arrangements are constructed from at least two transverse members and two vertical members. Each of the two rectangular end side arrangements has an inner surface comprised of an inner surface of the first transverse member, an inner surface of the second transverse member, an inner surface of the first vertical member, and an inner surface of the second vertical member. Each of the two vertical members has a relative top and bottom. On the inner surface of each of the two rectangular end side arrangements, the inner surface of the first vertical member is disposed opposite the inner surface of the second vertical member. Two wheels are attached to the bottom surface of each of the two rectangular end side arrangements, so that the two wheels are disposed distal to one another.

One longitudinal member is attached between the two rectangular end side arrangements so that the longitudinal member is parallel with the floor or ground. The other longitudinal member is attached between the two rectangular end side arrangements so that the longitudinal member forms an acute angle with the floor or ground. Specifically, in the embodiment used in this application, a first end of a first longitudinal member is attached to a first vertical member on the inner surface of the first rectangular end side arrangement, as near to the top of the vertical member as possible. A second end of the first longitudinal member is attached to a first vertical member on the inner surface of the second rectangular end arrangement, as near to the top of the vertical member as possible. Thus constructed, the two rectangular end side arrangements are parallel, separated by the first longitudinal member.

The first end of the second longitudinal member is attached to a second vertical member on the inner surface of the first rectangular end side arrangement, as near to the top of the vertical member as possible. A second end of the second longitudinal member is attached to a second vertical member of the inner surface of the second rectangular end side arrangement, as near to the bottom of the vertical member as possible. The second longitudinal member is not parallel to the ground plane, but rather has a slope.

The members of the frame can be constructed from commercial 2×4 lumber.

A gutter is attached to the inner surface of the second longitudinal member, meaning that the gutter flows generally downhill. A corrugated drainage surface extends from the first longitudinal member to the gutter, meaning that the corrugated drainage surface slopes downward towards the gutter. The corrugated drainage surface is sloped so that it drains into the gutter.

A first end of a first u-channel is connected to a planar horizontal surface of the first upper transverse member. A second end of the first u-channel is connected to a planar horizontal surface of the second upper transverse member. A first end of a second u-channel is connected to a planar horizontal surface of the first upper transverse member. A second end of the second u-channel is connected to a planar horizontal surface of the second upper transverse member. The first u-channel and the second u-channel are parallel. The first u-channel and the second u-channel are spaced so that they are almost as far apart as the side of the square attachment plate.

The attachment plate is fixed in the two u-channels with a plurality of through-hole connectors, which have a head and a shank. In the embodiment shown herein, with a square attachment plate, there are four connectors. The through hole connectors fit through through-holes in each of the four corners of the attachment plate. The shank of two of the connectors extends into the first u-channel; the shank of two of the connectors extend into the second u-channel. The shank of each through-hole connector is captured in its respective u-channel by a c-ring or equivalent.

The growing sled has a motor and drive system that rotates each of the plant support assembly. The upper surface of the plant support assembly is the upper surface of the plant-support plate. A receptacle for growing a plant rests on the upper surface of the plant-support plate. The drive system rotates the plant-support plate in an axis orthogonal to the upper surface of the plant-support plate.

The motor turns a drive shaft. For each plant support assembly, there is a drive wheel that is drivingly engaged with the drive shaft, moving at the same angular velocity as the drive shaft. For each plant support assembly, a closed-loop drive belt is driven by the drive wheel. The closed-loop drive belt goes over the drive wheel, around a plant-support drive wheel that is part of the plant support assembly, over a return wheel, and around a tensioner wheel. The return wheel is not drivingly engaged with the drive shaft, and may move freely of the drive shaft. The tensioner wheel is attached to a tensioner body. The tensioner body is attached to a support beam with two tensioner bands. The support beam is affixed to the sled frame. The tensioner bands are fixed to the support beam with fasteners. The tensioner configuration allows the motor and drive shaft to smoothly rotate the plant support assembly at each of the plurality of plant stations. In an indoor, industrial growing environment, plant rotation leads to more robust plants and higher yields. In a static setting, each side of a plant can be exposed to different amounts of light, different angles of light, different air-flow, and different amounts of air-born irrigation and moisture. These micro-climatic differences lead to uneven growth.

The growing sled has wheels positioned at each of its four corners. The wheels on the growing sled allow the scalable and re-configurable system for indoor growing to be easily reconfigured and re-positioned. A plurality of growing sleds can be positioned to share a common gutter system and drainage basin. A plurality of growing sleds can also be positioned to share a common irrigation feed tube and a common lighting system. Since the sleds are easily moved, they can be placed much closer together than racks in a traditional indoor growing environment. They can also be placed around obstructions such as support beams in order to maximize the usable footprint of a building.

BRIEF DESCRIPTION OF THE DRAWINGS

The present invention, a scalable and re-configurable system for indoor growing, is illustrated with 14 drawings on 15 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, a scalable and re-configurable system for indoor growing. While embodiments of the invention are illustrated and described, the embodiments herein do not represent all possible forms of the invention. Rather, the descriptions, illustrations, and embodiments are intended to teach and inform one skilled in the art without limiting the scope of the invention.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size and orientation of aspects of the present invention, a scalable and re-configurable system for indoor growing. The terminology includes the words above specifically mentioned, derivatives thereof, and words of similar import.

Figure 9:
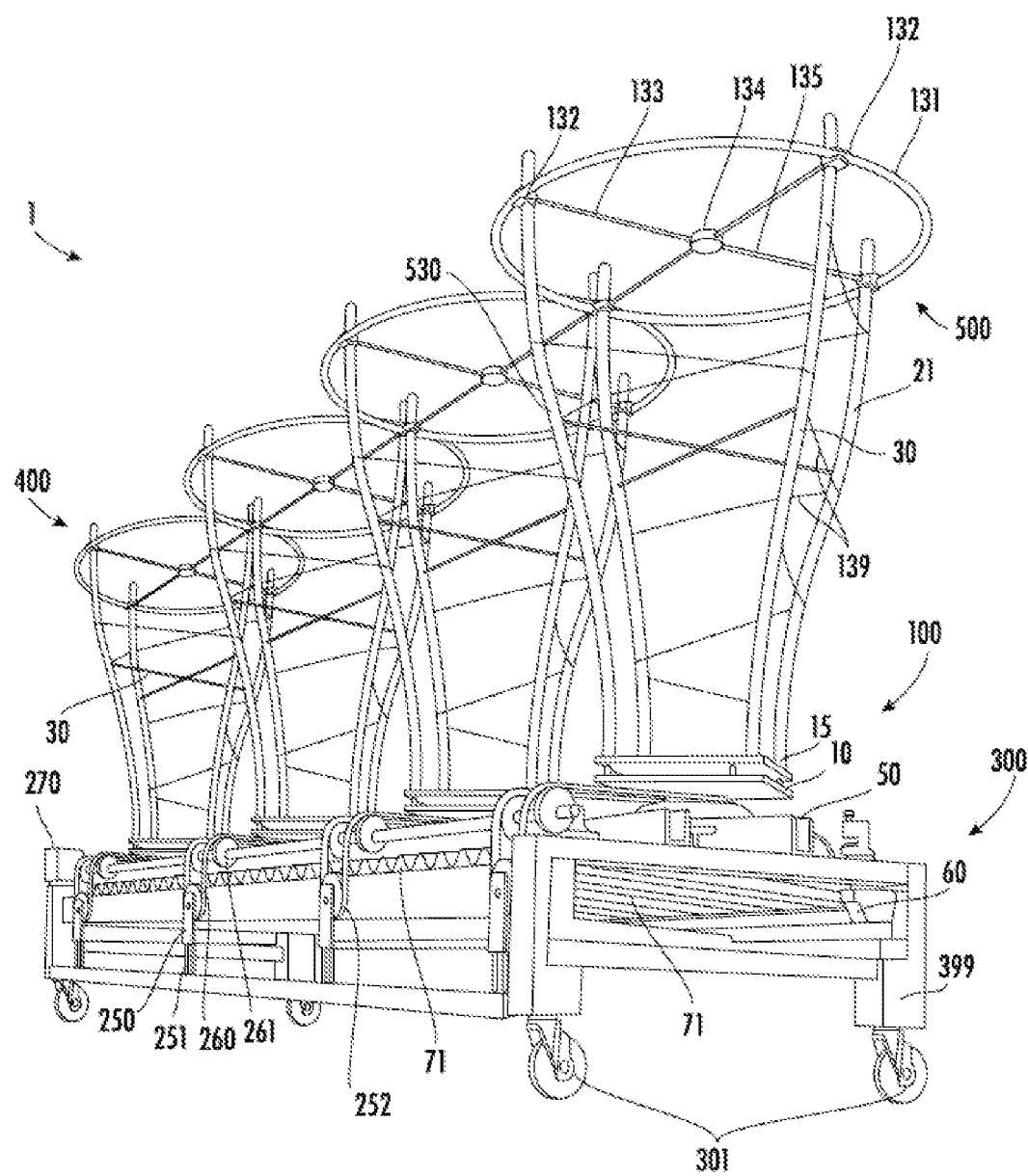
FIG. 9 is a first-longitudinal-sided perspective view of a complete growing sled.

FIG. 9 shows a first-longitudinal-sided view of the present invention 1, a scalable and re-configurable system for indoor growing 1. The scalable and re-configurable system for indoor growing 1 is comprised of at least one growing sled 300, in which each growing sled 300 has a plurality of plant stations 400. Each plant station 400 has a forced frame 500 and a plant support assembly 100. A forced frame 500 is used to confine each plant to a known foot-print. This is necessary in indoor growing in order to make the production uniform and efficient.

The forced frame 500 is comprised of a plurality of forced frame vertical members 21 and an upper retaining rim 131. The upper retaining rim being the upper most element of the scalable and re-configurable system for indoor growing 1. The retaining rim 131 has two intersecting spokes 133, 135, which are designed to provide the retaining rim 131 with structural rigidity without blocking the ability of a plant to grow through the retaining rim 131. The upper retaining rim 131, intersecting spokes 133, 135, and forced frame vertical members 21 are connected to one another with retention clips 132. Two cross members 30 attach opposing pairs of forced frame vertical members 21, at the approximate midpoint 530 of the forced frame vertical member 21. The two cross-members 30 add structural rigidity without confining a plant within the forced frame 500. A filament 139 wraps around the forced frame 500 vertical members 21, to confine the plant within the forced frame 500.

The forced frame 500 is attached to the plant support assembly 100 at the plant-support plate 15, the surface upon which a plant will rest. A base plate 10 underneath the plant-support plate 15 provides spacing for the attachment with the forced frame 500. The plant support assembly 100 mates to the growing sled 300 at a u-channel 50.

The growing sled 300 has a frame 399 and wheels 301. The wheels 301 on the growing sled 300 allow the scalable and re-configurable system for indoor growing 1 to be easily reconfigured and re-positioned. The growing sled 300 has a corrugated drainage surface 71 that drains into a gutter 60. The growing sled 300 has a motor 270 and drive system 250, 251, 252, 260, 261 that rotates each plant support assembly 100.

Figure 14:
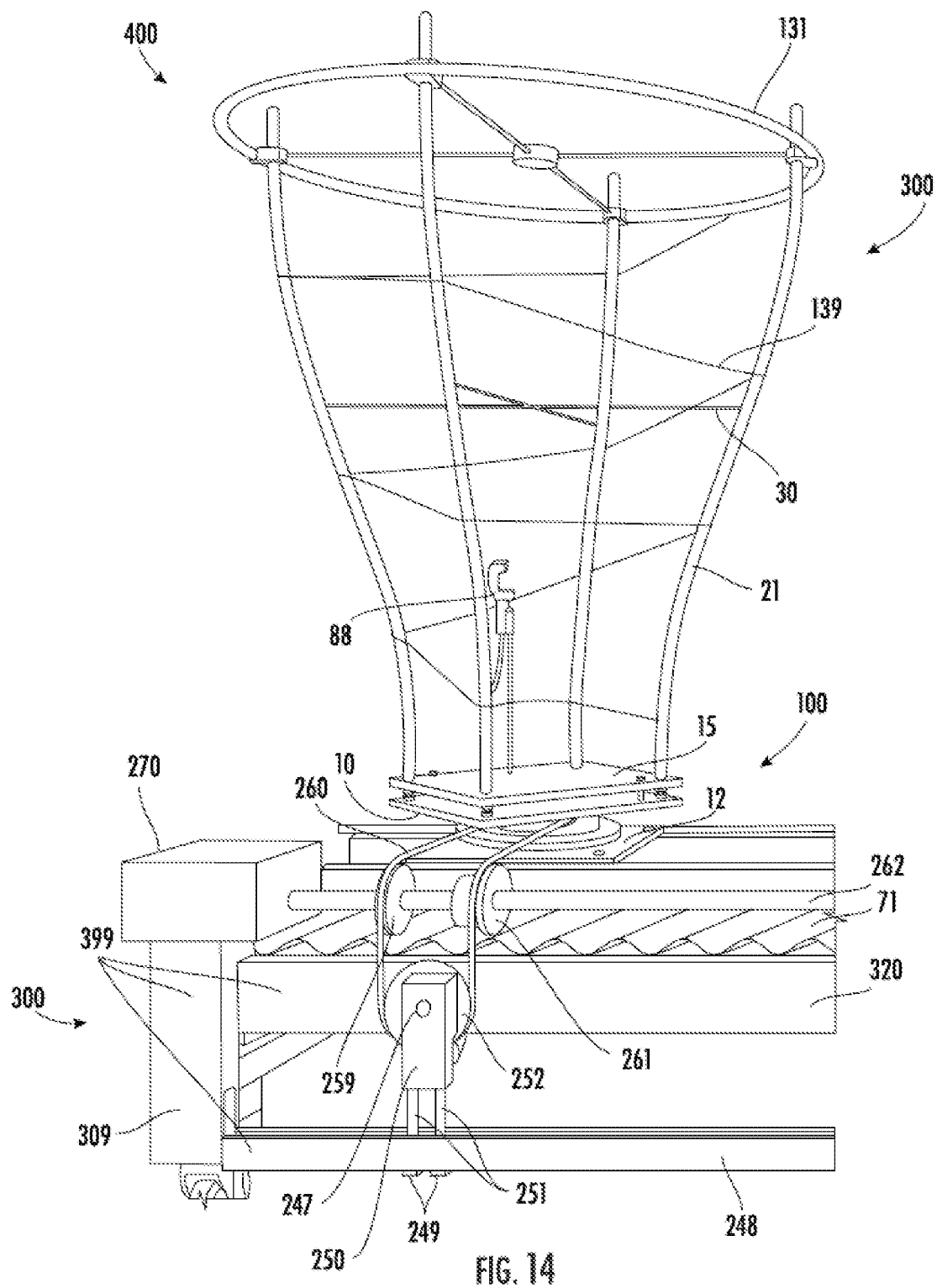
FIG. 14 is a perspective isolation of a single plant station on the sled.

FIG. 14 illustrates the detail of one embodiment of the drive system 250, 251, 252, 260, 261. FIG. 14 shows a single plant station 400, in situ. The plant station 400 has the forced frame 300 and plant support assembly 100, as previously discussed. Some familiar elements of the forced frame 400 are shown: the upper retaining rim 131; two cross-members 30; a filament 139; and the forced frame vertical members 21. Additionally, two familiar elements of the plant support assembly 100 are shown: the base plate 10 and the plant-support plate 15. The attachment plate 12 of the plant support assembly 100 is also visible.

Various elements of the growing sled 300 frame 399 are shown: a vertical member 309, a longitudinal member 322, and a support beam 248. The corrugated drainage surface 71 of the growing sled 300 is also shown, for reference.

The motor 270 turns a drive shaft 262. A shaft-mounted drive wheel 259 is drivingly engaged with the drive shaft 262, and moves at the same angular velocity as the drive shaft 262. A closed-loop drive belt 260 is driven by the shaft-mounted drive wheel 259. The closed-loop drive belt 260 goes over the shaft-mounted drive wheel 259, around the plant support assembly 100, over a return wheel 261, and around a tensioner wheel 252. The closed-loop drive belts 260, shaft-mounted drive wheels 259, and plant support assemblies 100 are mapped to one another on a one-to-one-to-one basis. In other words, each closed-loop drive belt 260 is drivingly engaged with one shaft-mounted drive wheel 259. Each closed-loop drive belt 260 rotates one plant support assembly 100. The return wheel 261 is not drivingly engaged with the drive shaft 262, and may move freely of the drive shaft 262. The tensioner wheel 252 is attached to a tensioner body 250. The tensioner body 250 is attached to the support beam 248 with two tensioner bands 251. The tensioner bands 251 are fixed to the support beam 248 with fasteners 249. The tensioner assembly 249, 250, 251, 252 allows the motor 270 and drive shaft 262 to smoothly rotate the plurality of plant stations 400. In an indoor, industrial growing environment, plant rotation leads to more robust plants and higher yields. In a static setting, each side of a plant can be exposed to different amounts of light, different angles of light, different air-flow, and different amounts of air-born irrigation and moisture. These micro-climatic differences lead to uneven growth.

Figure 1A:
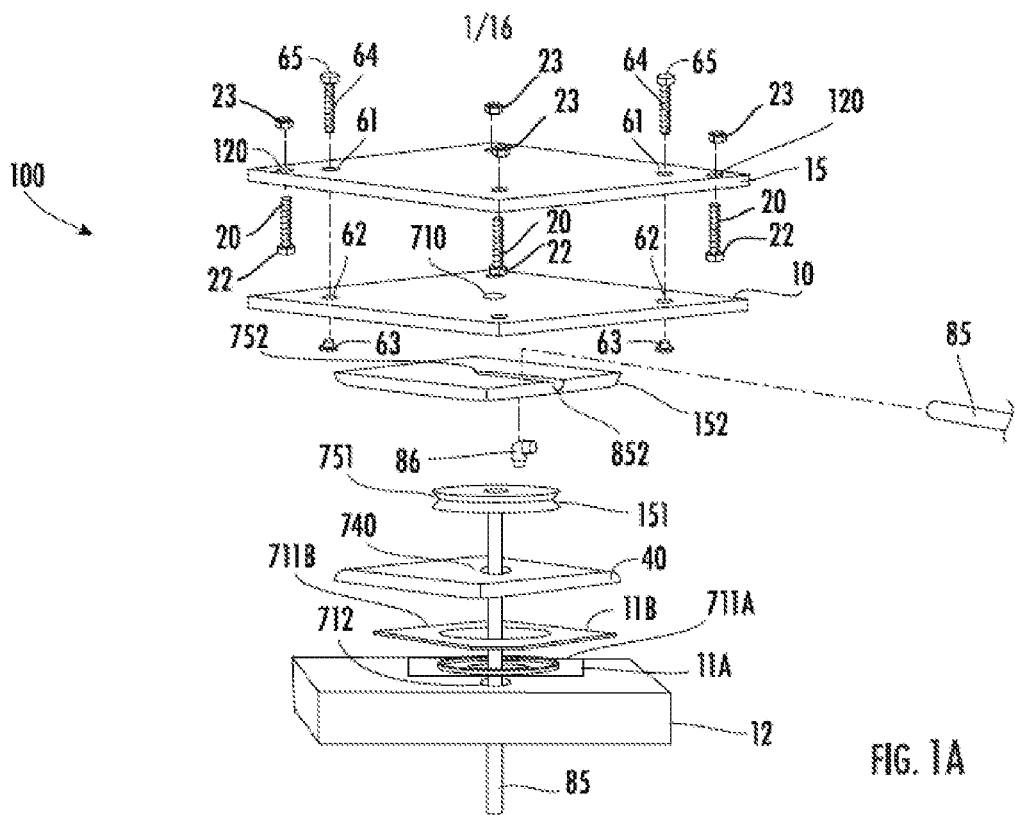
FIG. 1A is an exploded view of a plant support assembly.
Figure 1B:
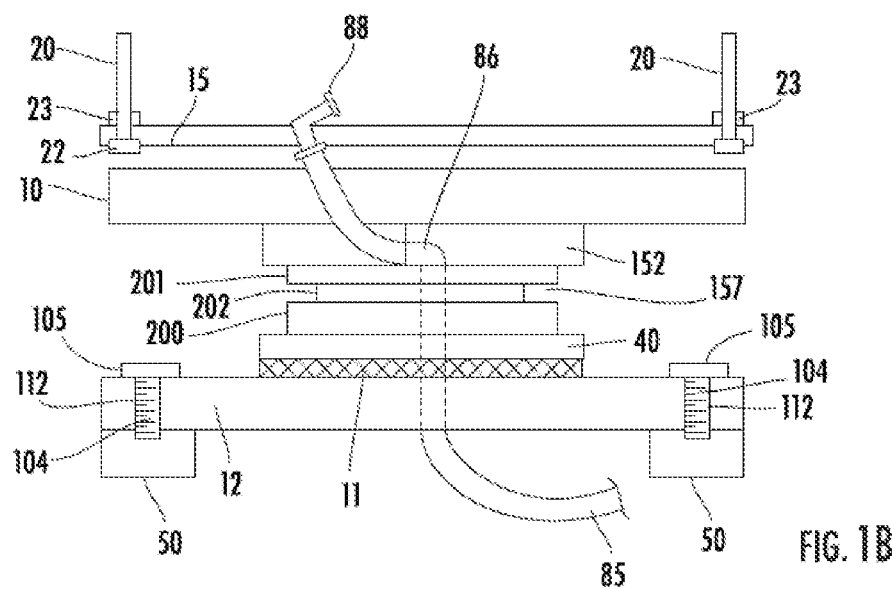
FIG. 1B is a side view of a plant support assembly.

FIGS. 1A and 1B show the plant support assembly 100 in detail. FIG. 1A is an exploded view. Starting at the bottom of the plant support assembly 100 is the attachment plate 12, which attaches the plant support assembly 100 to the growing sled 300. The bottom piece 11B of a two-piece rotational bearing 11A, 11B attaches to the attachment plate 12. The top piece 11A of the two-piece rotational bearing 11A, 11B attaches a lower spacer plate 40. The lower spacer plate 40 attaches to a plant-support drive wheel 151. The plant-support drive wheel 151 attaches to an upper spacer plate 152. The upper spacer plate 152 attaches to base plate 10. The base plate attaches to a plant-support plate 15. The base plate 10 is attached to the plant support plate 15 using two threaded fasteners 65 and two T-nuts 63. Each of the two threaded fasteners 65 is fed through a hole 61 in the top of the plant-support plate 15 and a hole 62 in the base plate 10. The threads 64 on the threaded fastener 65 are then captured with a T-nut 63. The two threaded fasteners 65 and T-nuts 63 act to stabilize the plant-support plate 15 and ensure its proper rotation. In this manner, the plant-support plate 15 is kept from tilting with respect to the base plate 10.

Threaded fasteners 20 are fed through holes 120 in the plant-support plate 15. The shank 20 of the threaded fastener 20 extends upward. The threaded fastener 20 is fixed to the plant-support plate 15 with a nut 23, which is tightened until the head 22 of the threaded fastener 20 is tight against the plant-support plate 15.

The plant support assembly 100 is designed to facilitate irrigation through a plurality of hoses 85 and elbows 86. The structural elements of the plant support assembly 100 have through holes 712, 711A, 711B, 740, 751, 752. An irrigation hose 85 extends through the through holes 712, 711A, 711B, 740, 751, 752 to the upper spacer plate 152 of each of the plurality of plant support assemblies 100. A hose elbow 86 connects to the hose and nests into a grove 852 formed in the upper spacer plate 152. Another length of hose 85 nests into the grove 852 and mates with the elbow 86.

FIG. 1B shows the plant support assembly 100 from the side. From bottom to top, there is the attachment plate 12, the two-piece rotational bearing 11, a lower spacer plate 40, a plant-support drive wheel 151, an upper spacer plate 152, a base plate 10, and a plant-support plate 15. The plant-support drive wheel 151 has a lower rim 200, an upper rim 201, and a drive cylinder 202. The lower rim 200 and the upper rim 201 keep the closed-loop drive belt 260 centered on the drive cylinder 202.

The attachment plate 12 has a hole at each corner 112. A connector 104, 105, having a shank 104 and a head 105, fits through the hole 112 and extends into the u-channel 50, fixing the plant support assembly 100 to the sled 300.

Figure 3A:
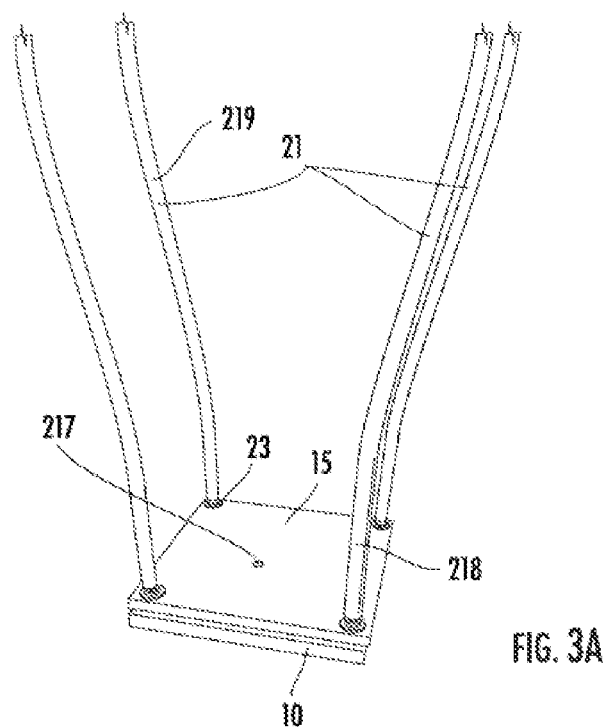
FIG. 3A is a perspective view of the vertical members of the forced frame mounted onto the plant-support plate.
Figure 3B:
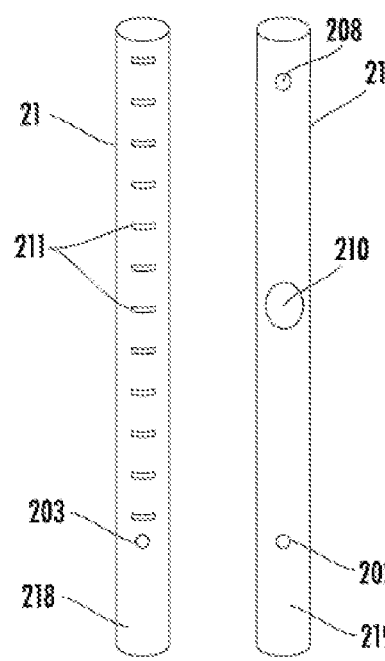
FIG. 3B is a close-up of the features of the vertical members of the forced frame.
Figure 4:
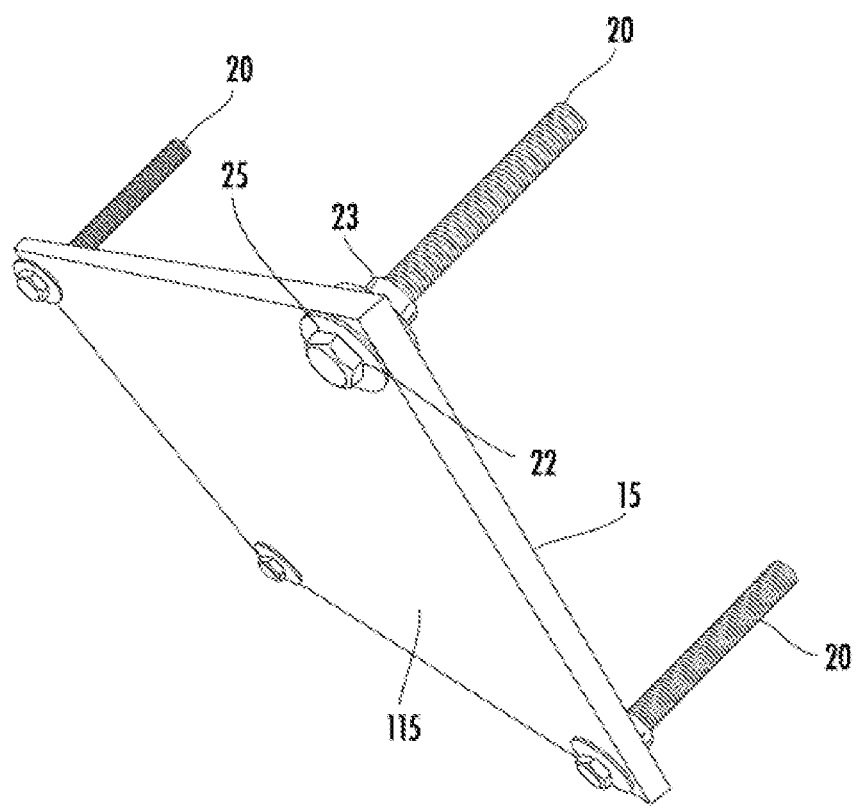
FIG. 4 is a bottom perspective of the plant-support plate.

As shown in FIGS. 2-5, the forced frame 500 is connected to the plant support assembly 100. First, FIG. 4 shows the plant-support plate 15. In this illustration, the bottom surface 115 of the plant-support base 15 is visible. A plurality of threaded fasteners 20 protrude through the plant-support plate 15 with the shanks 20 of the threaded fasteners 20 pointing upward, away from the bottom surface 115. A washer 25 is disposed between the head 22 and the bottom surface 115 for each threaded fastener 20. The threaded fasteners 20 are held in place with a nut 23 that is tightened until the head 22 is snug against the washer 25 and the bottom surface 115.

Figure 2A:
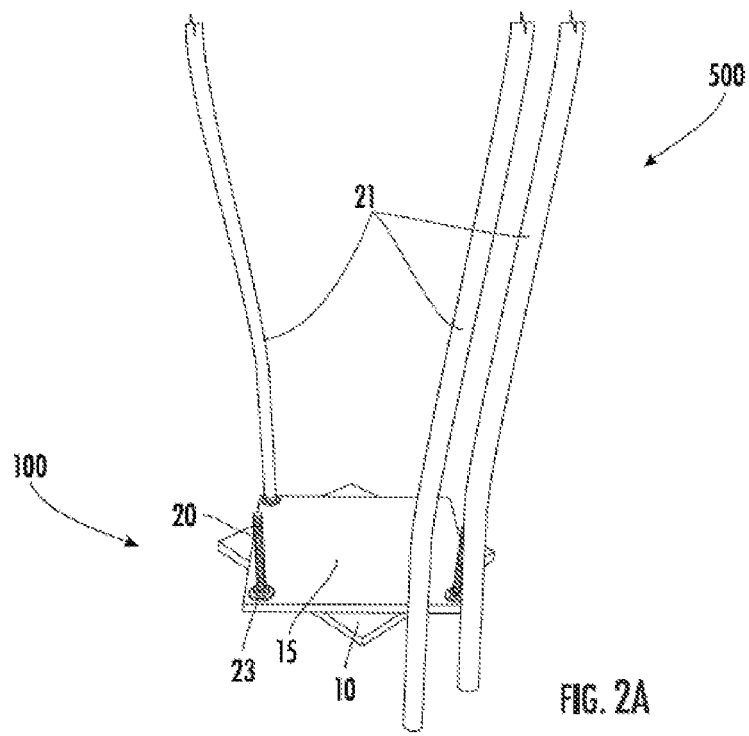
FIG. 2A is a perspective view showing the mounting of a plant forced frame onto the plant-support plate.
Figure 2B:
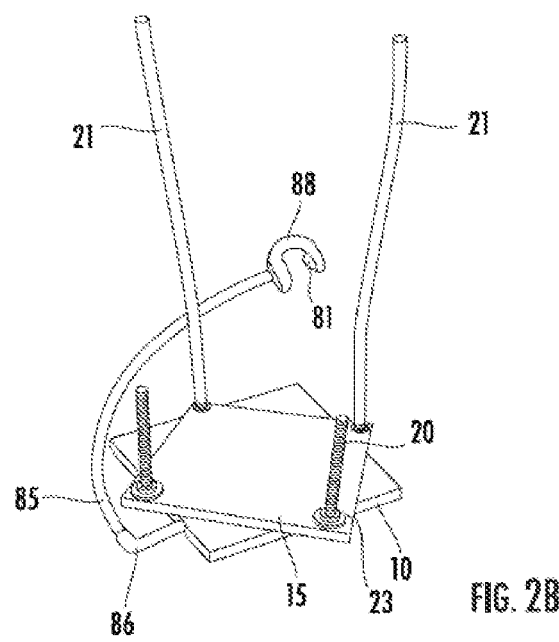
FIG. 2B is a perspective view showing the irrigation feed on the plant-support plate.

Referring to FIGS. 2A and 2B, the forced frame 500 is connected to the plant support assembly 100 by attaching the forced frame vertical members 21 to the upward-extending fastener shanks 20 protruding from the top of the plant-support plate 15. The shank 20 extends upwards from the plant-support plate 15. A nut 23 captures the shank 20. The forced frame vertical members 21 fit over the shank 20. Also shown for reference are the base plate 10 and parts of the irrigation system, namely, hose 85, elbow 86, a c-shaped nozzle housing 88, and a nozzle 81.

FIGS. 3A and 3B continue the illustration of fastening the forced frame 500 to the plant support assembly 100. FIG. 3A shows all of the forced frame vertical members 21 installed. The forced frame vertical members 21 are flush against the retaining nut 23. Each of the forced frame vertical members 21 has a generally cylindrical surface 218, 219. Part of the cylindrical surface 218 faces away from the center 217 of the plant-support plate 15. Part of the cylindrical surface 219 faces towards the center 217 of the plant-support plate 15

FIG. 3B shows some of the features of the forced frame vertical members 21. On the side 218 of the forced frame vertical member 21 that faces away from the center 217 of the plant-support plate 15, there are a plurality of slots 211 which captures the filament 139. At the bottom is a small hole 203 into which the knotted end of the filament 139 fits. On the side 219 of the forced frame vertical member 21 that faces towards the center 217 of the plant-support plate 15, there are two additional small holes 202, 208 into which the knotted end of the filament 139 fits. Also, this side of the surface 219 has a larger hole 210, approximately midway, into which the cross members 30 fit.

Figure 5:
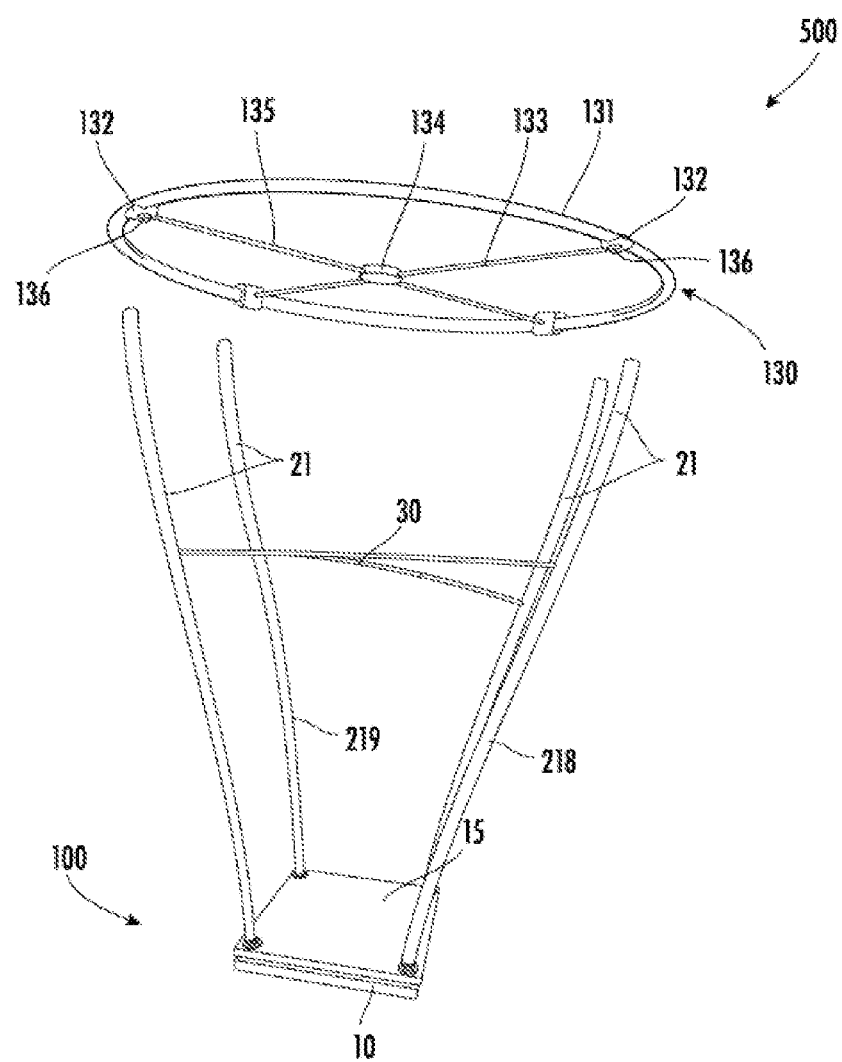
FIG. 5 is a perspective view of the plant-support plate and base plate with a forced frame.

FIG. 5 further illustrates the attachment of the forced frame 500 to the plant support assembly 100. Although the forced frame 500 is nearly complete in FIG. 5 (the filament 139 is not shown), only the relevant portion of the plant support assembly 100 is shown: the base plate 10, and the plant-support plate 15. The forced frame 500 is comprised of a plurality of forced frame vertical members 21 and rim assembly 130. The rim assembly 130 is comprised of the upper retaining rim 131, two intersecting spokes 133, 135, a plurality of retentions clips 132, and a center piece 134. The upper retaining rim 131 of the rim assembly 130 being the upper most element of the scalable and re-configurable system for indoor growing 1. The retaining rim 131 is joined with two intersecting spokes 133, 135, which are designed to provide the rim assembly 130 with structural rigidity without blocking the ability of a plant to grow through the upper retaining rim 131. The upper retaining rim 131, intersecting spokes 133, 135, and forced frame vertical members 21 are connected to one another with retention clips 132. The retention clips 132 have holes 136 into which the forced frame vertical members 21 fit. A center piece 134 captures the two intersecting spokes 133, 135. Two cross members 30 attach opposing pairs of forced frame vertical members 21, fitting into the larger holes 210 of the forced frame vertical member 21. The two cross-members 30 add structural rigidity without confining a plant within the forced frame 500. Combined, the forced frame 500 and plant support assembly 100 form a plant station 400 as discussed in reference to FIG. 14, above.

The c-shaped nozzle housing 88 and a nozzle 81 are designed to fit over the upper retaining rim 131 so that each plant station 400 can be independently irrigated.

Figure 7:
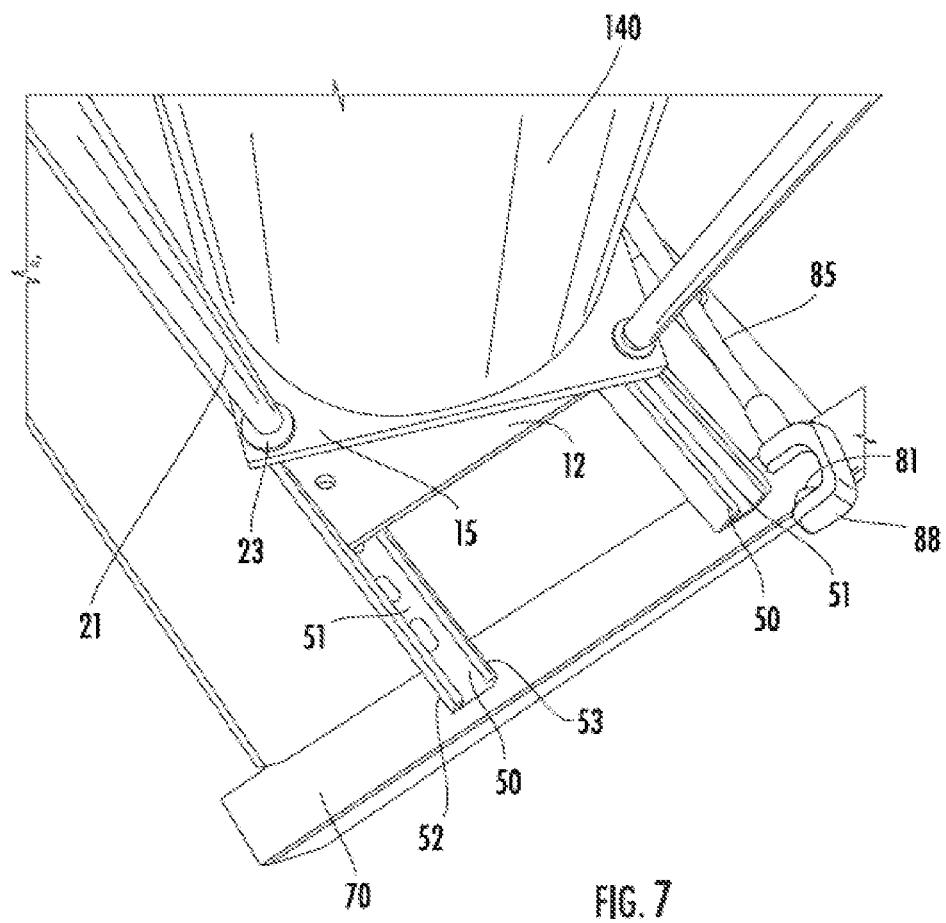
FIG. 7 is an isolation close-up of the end of a growing sled.

FIG. 7 is a close-up, illustrating how the plant station 400 sits on the sled 300. A receptacle 140 for growing a plant rests on the plant support plate 15. The attachment plate 12 is attached to twos u-channels 50. Each u-channel 50 has a first side surface 52, a second side surface 53, and a bottom surface 51. The u-channels 50 are attached to a planar surface 70 of the sled 300. Shown for reference in this illustration are the forced frame vertical members 21, the retaining nuts 23, the hose 85, the c-shaped nozzle housing 88, and the nozzle 81.

Figure 8A:
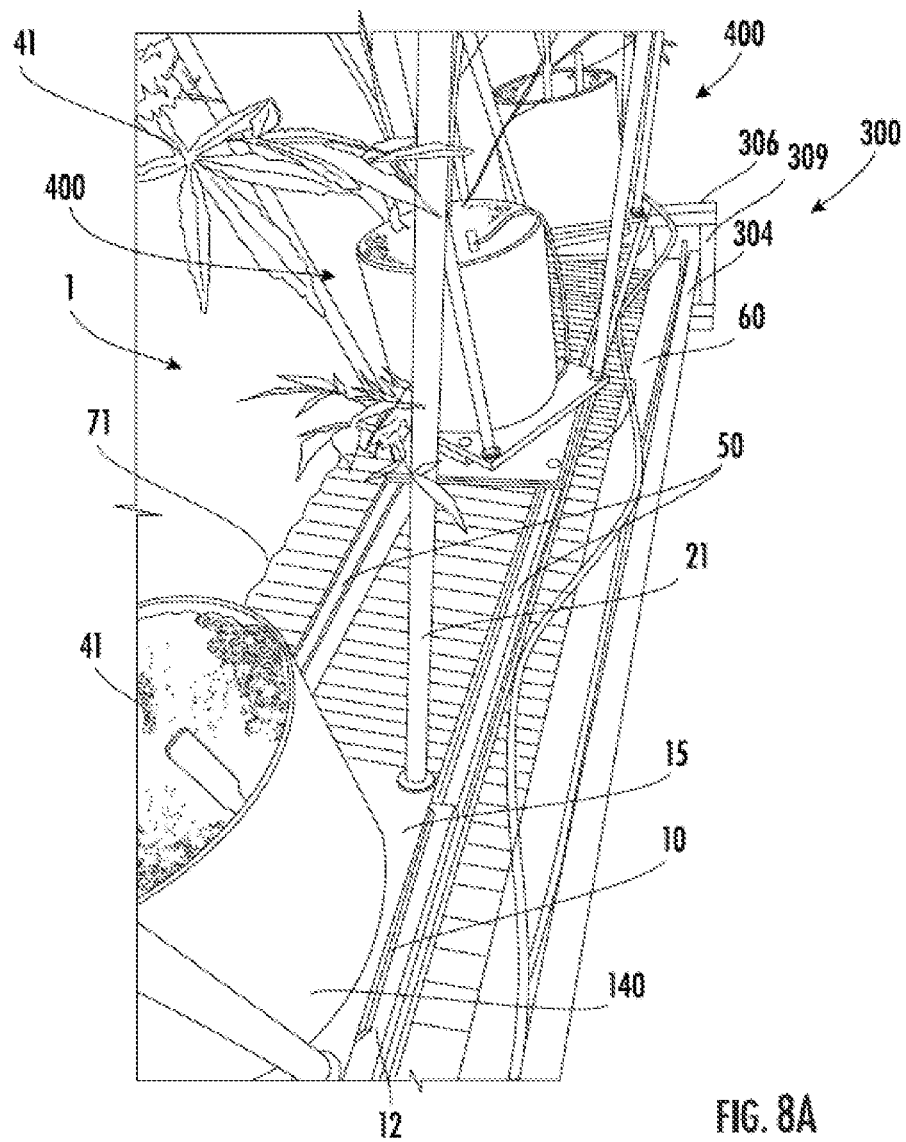
FIG. 8A is an isolation close-up of a growing sled with plants.
Figure 8B:
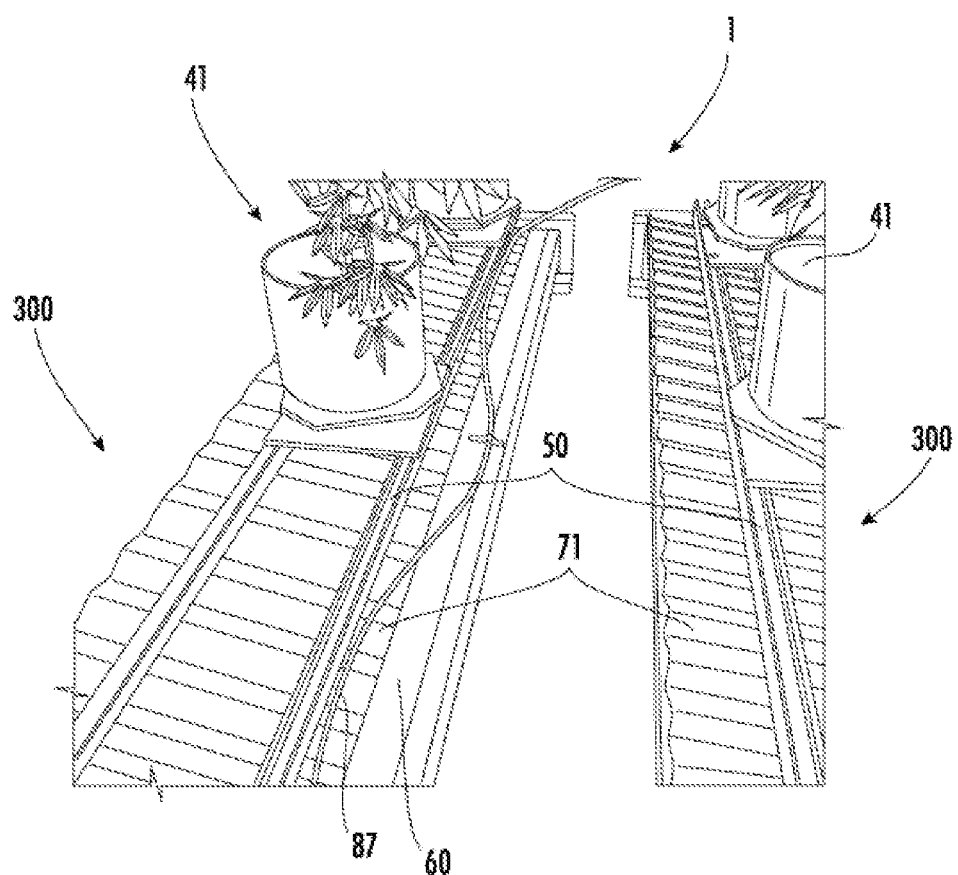
FIG. 8B is a perspective isolation of side-by-side sleds.

FIGS. 8A and 8B illustrate the present invention, a scalable and re-configurable system for indoor growing 1.

FIG. 8A shows an isolation of a plurality of plant stations 400 on a single sled 300; FIG. 8B shows an isolation of side-by-side sleds 300. FIG. 8A shows a plurality of plants 41 in receptacles 140. Each receptacle 140 rests on a plant-support plate 15. Also visible are the base plate 10 and the attachment plate 12. The attachment plate 12 is attached to the sled 300 at the u-channels 50. The forced frame vertical members 21 are attached to the plant-support plates 15.

The growing sled 300 has a corrugated drainage surface 71 that drains into a gutter 60. Additional elements of the sled 300 frame 399 are visible in this view: a vertical member 309, a longitudinal member 304, and a transverse member 306.

FIG. 8B expands the concept by showing side-by-side sleds 300. In this view, a common irrigation hose 87 is shown, which feeds all of the hoses 85 for each plant station 400.

Figure 10:
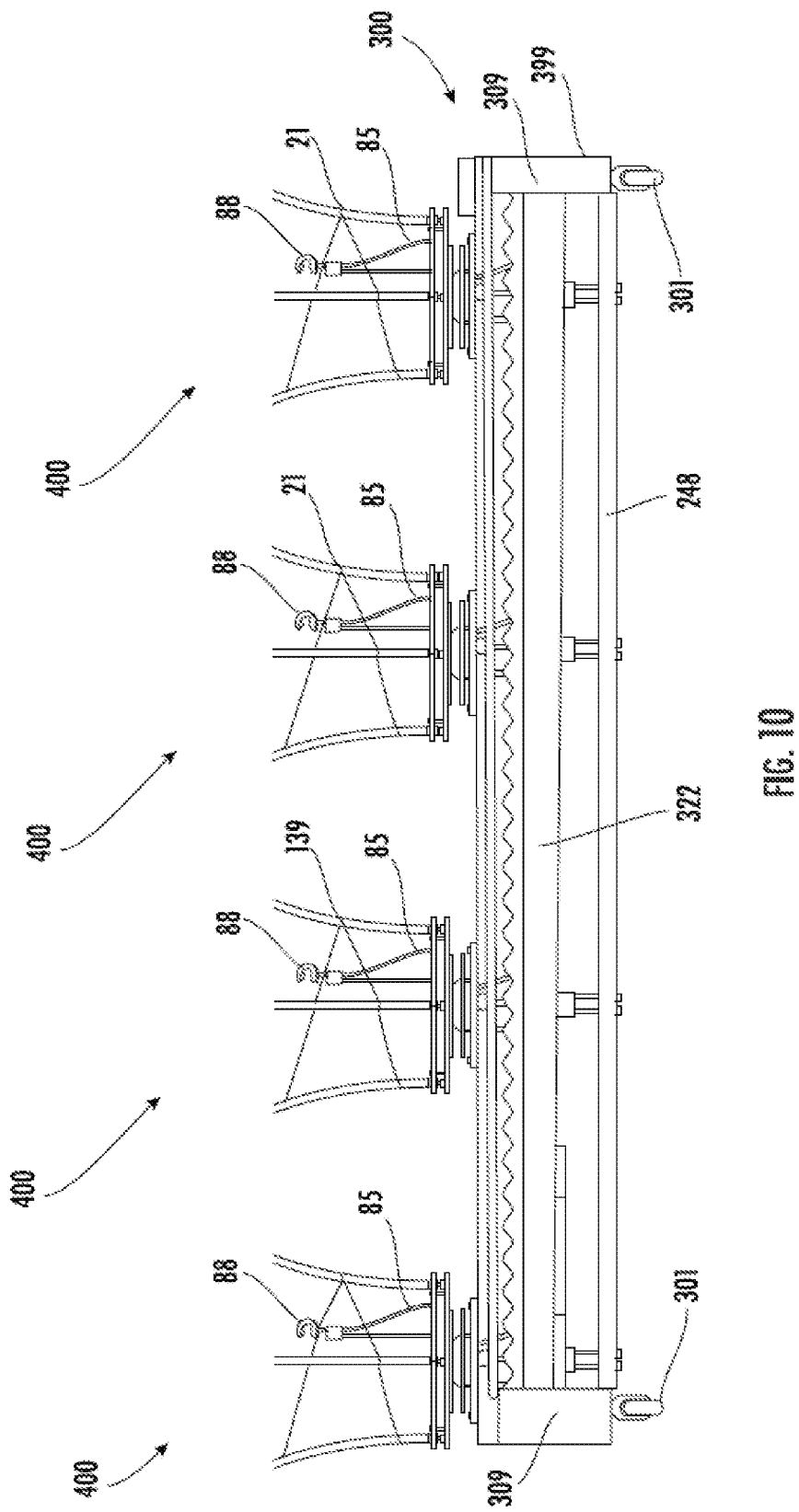
FIG. 10 is a side view of a growing sled, with the top of the forced frame cut-off to expose the irrigation elements.

FIG. 10 is a side view of a growing sled 300 with a plurality of plant stations 400. The drive mechanism of the sled 300 and the upper part of the plant station are omitted from this view. In this view, elements of the frame 399 are visible: two vertical member 309, a longitudinal member 322, and a support beam 248. The hose 85, c-shaped nozzle housing 88, filament 139, and forced frame vertical members 21 are also shown.

Figure 11:
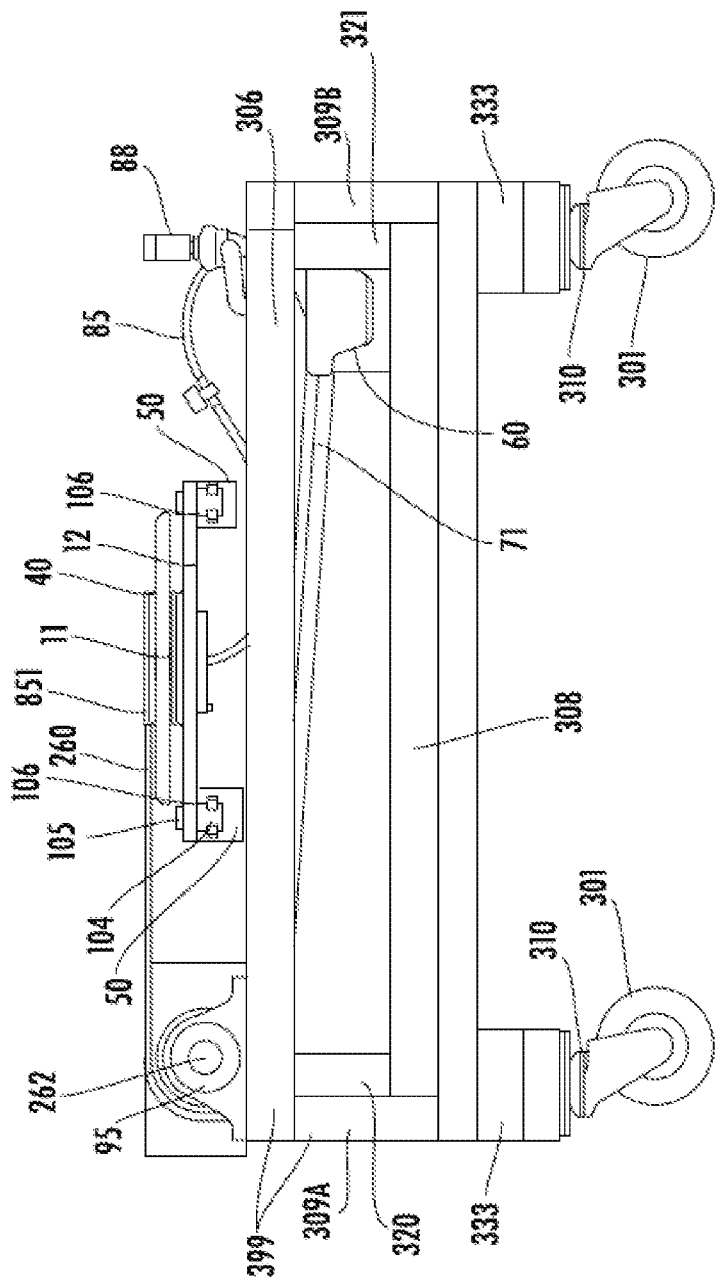
FIG. 11 is an end view of just the growing sled.
Figure 12:
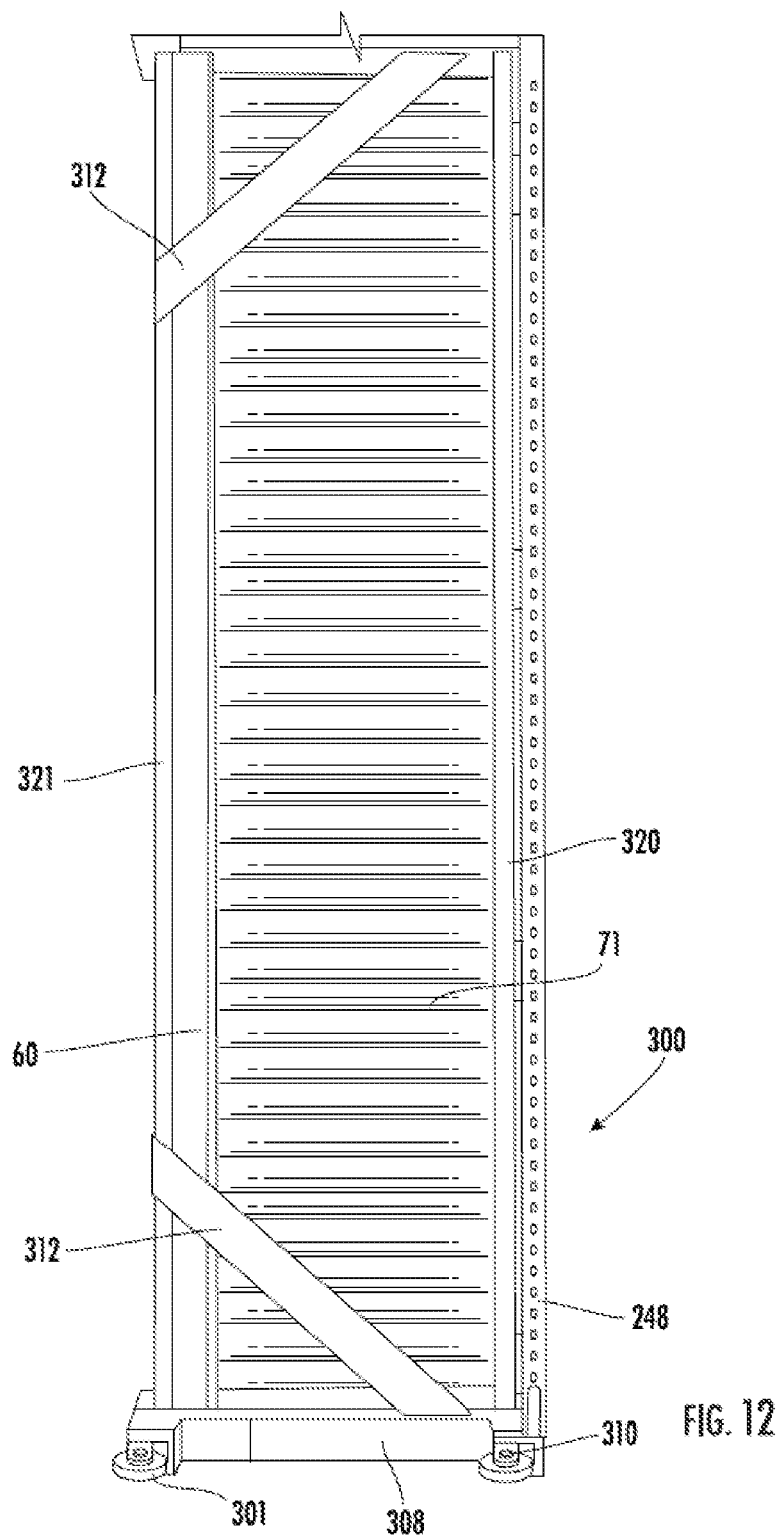
FIG. 12 is a bottom view of a growing sled.
Figure 15:
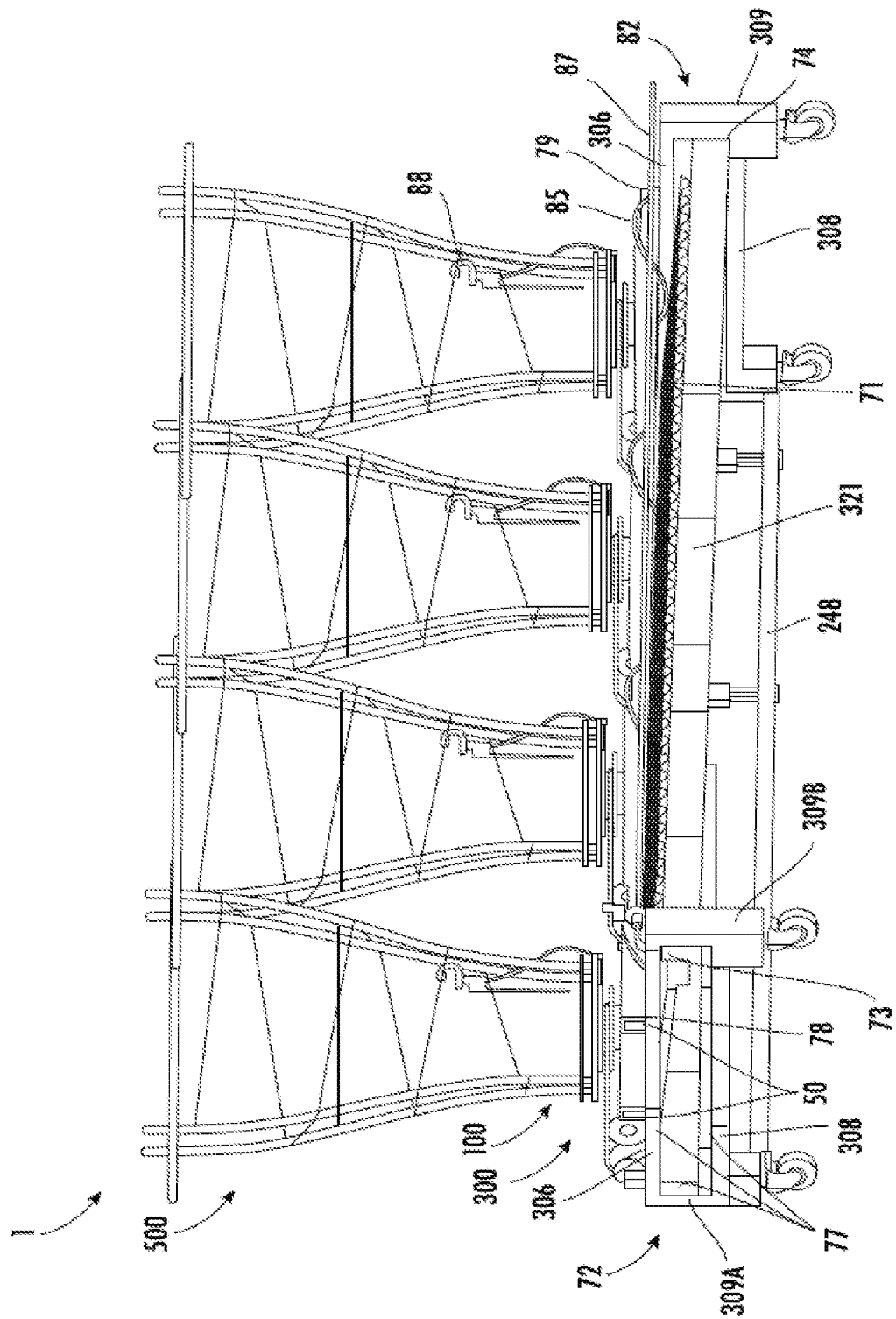
FIG. 15 is a second-longitudinal-sided perspective view of a complete growing sled.

FIG. 11 is an end view of a growing sled 300 in partial isolation. FIG. 12 is a bottom view of the sled 300. FIG. 15 is a second-longitudinal-sided view of a complete growing sled 300. The frame 399 of each sled 300 is rectangular. Referring first to FIG. 12, the lower longitudinal members 320, 321 are on either side of the corrugated drainage surface 71. The closed-loop drive belt support beam 248 is also visible. Two gutter supports 312 provide stability to the gutter 60. The lower transverse member 308 is visible at one end. The casters 310 and wheels 301 are visible from the bottom.

Looking at FIG. 15, the sled 300 has two rectangular end side arrangements 72 and two longitudinal members 320, 321. Each u-channel 50 has two ends 78, 79. One end of each u-channel 50 is attached to an upper transverse member 306 of a first rectangular end side arrangement 72 of the sled 300. A second end 79 of each u-channel 50 is attached to an upper transverse member 306 of a second end side arrangement 82 of the sled 300. The two u-channels 50 are parallel to one another 50.

Each of the two rectangular end side arrangements 72, 82 are constructed from at least two transverse members 306, 308 and two vertical members 309. Each of the two rectangular end side arrangements 72, 82 has an inner surface 77 comprised of an inner surface 77 of the first transverse member 306, an inner surface 77 of the second transverse member 308, an inner surface 77 of the first vertical member 309A, and an inner surface (not visible in FIG. 15) of the second vertical member 309B. Each of the two vertical members has a relative top 73 and bottom 74. On the inner surface 77 of each of the two rectangular end side arrangements 72, 82, the inner surface 77 of the first vertical member 309A is disposed opposite the inner surface of the second vertical member 309B.

A first longitudinal member 320 is attached between the two rectangular end side arrangements 72, 82 so that the longitudinal member 320 is parallel with the floor or ground. The second longitudinal member 321 is attached between the two rectangular end side arrangements 72, 82 so that the second longitudinal member 321 forms an acute angle with the floor or ground. Specifically, in the embodiment used in this application, a first end of a first longitudinal member 320 is attached to a first vertical member 309A on the inner surface 77 of the first rectangular end side arrangement 72, as near to the top 73 of the vertical member 309A as possible. A second end of the first longitudinal member 320 is attached to a first vertical member 309A on the inner surface 77 of the second rectangular end arrangement 82, as near to the top 73 of the vertical member 309A as possible. Thus constructed, the two rectangular end side arrangements 72, 82 are parallel, separated by the first longitudinal member 320.

The first end of the second longitudinal member 321 is attached to a second vertical member 309B on the inner surface 77 of the first rectangular end side arrangement 72, as near to the top 73 of the vertical member 309B as possible. A second end of the second longitudinal member 321 is attached to a second vertical member 309B of the inner surface 77 of the second rectangular end side arrangement 82, as near to the bottom 74 of the vertical member 309B as possible. The second longitudinal member 321 is not parallel to the ground plane, but rather has a slope. In other words, the length or longest dimension of the first longitudinal member 320 is parallel with the ground plane. The length or longest dimension of the second longitudinal member 321 forms an acute angle with the ground plane.

Referring now to FIGS. 11 and 15, the members 306, 308, 309A, 309B, 320, 321 of the frame 399 can be constructed from commercial 2×4 lumber.

A gutter 60 is attached to the inner surface of the second longitudinal member 321, meaning that the gutter 60 flows generally downhill. A corrugated drainage surface 71 extends from the first longitudinal member 320 to the gutter 60, meaning that the corrugated drainage surface 71 slopes downward towards the gutter. The corrugated drainage surface 71 is sloped so that it drains into the gutter 60.

The u-channel 50 is connected to the planar surface 70 of the upper transverse member 306. Part of the plant support assembly 100 is visible in this view: the attachment plate 12, the two-piece rotational bearing 11, a lower spacer plate 40, and the plant-support drive wheel 151. The closed-loop drive belt 260 attaches around the plant-support drive wheel 151. The attachment plate 12 is fixed in the u-channel 50 with a plurality of through-hole connectors 104, 105, which have a head 105 and a shank 104. The shank 104 extends into the u-channel 50, where it is captured by a c-ring 106 or equivalent. In this view, the drive shaft 262 is visible on-end. The drive shaft 262 is held in place with a terminal bushing 95. An irrigation hose 85 and a c-shaped nozzle housing 88 are also visible from this view.

Figure 13:
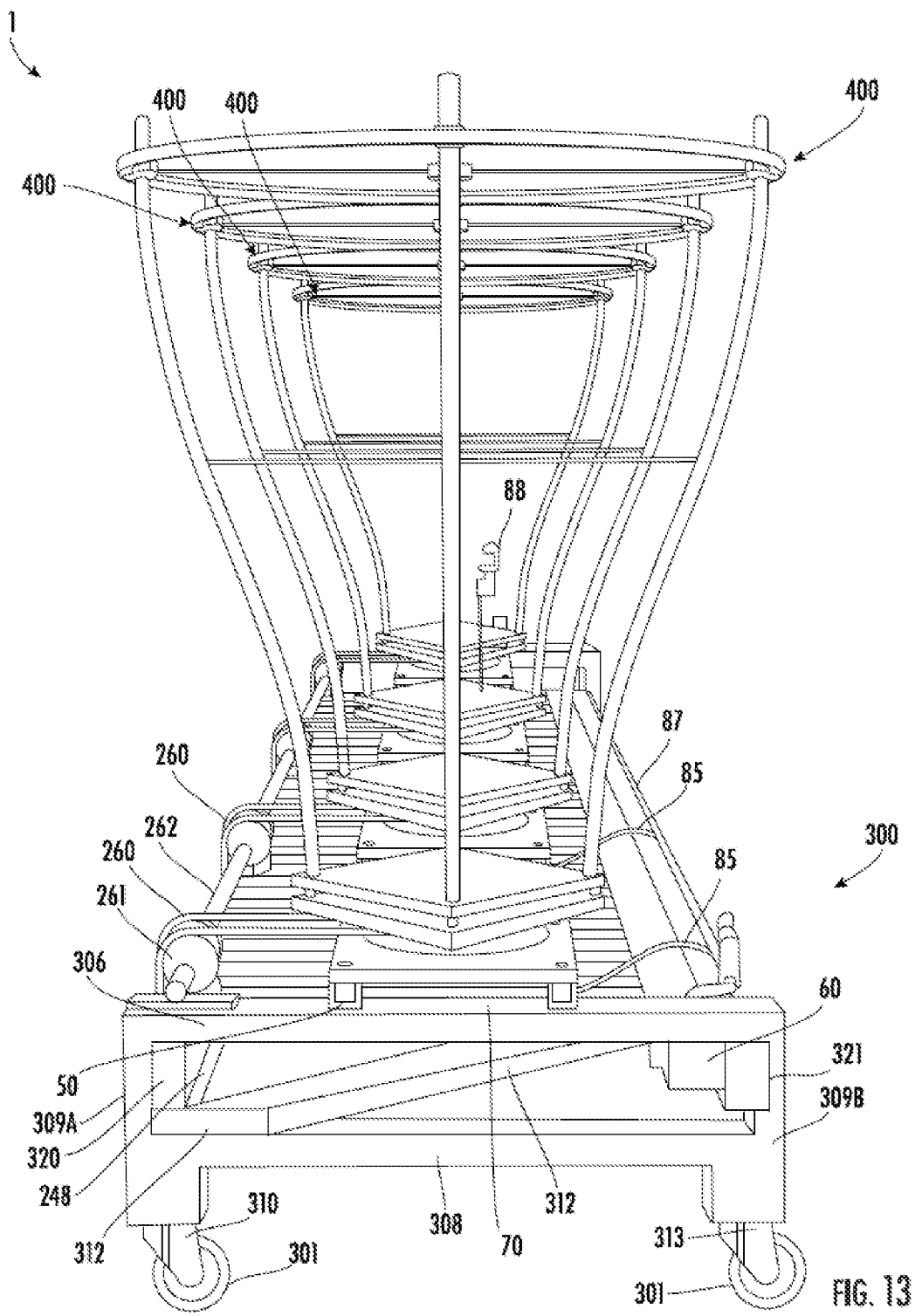
FIG. 13 is an end view of a complete growing sled.

FIG. 13 shows the plurality of plant stations 400 on a single sled 300. Part of the drive system is visible on the left: the drive shaft 262, a plurality of closed-loop drive belts 260, the return wheel 261 and the support beam 248. The short end of the frame has an upper transverse member 306, a lower transverse member 308, two vertical members 309, a gutter 60, a gutter support 312, two casters 310, and two wheels 301. The u-channels 50 are connected to the planar surface 70 of the upper transverse member 306. The common feeder hose 87 and individual hoses 85 of the irrigation system are visible. Only a single plant station 400 has the upper part of the hose 85 and the c-shaped nozzle housing 88, in order to improve the legibility of this figure.

Figure 6:
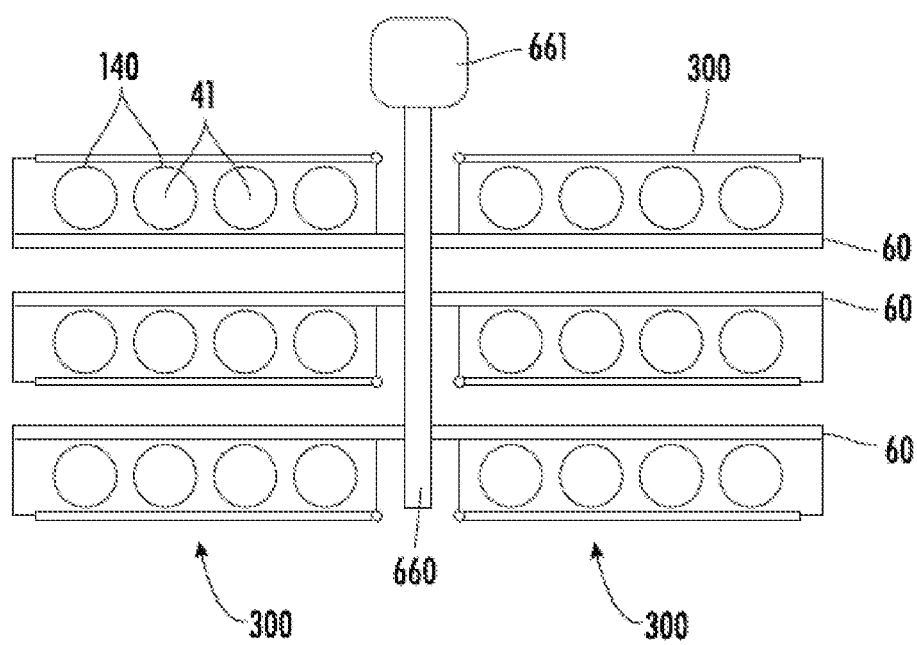
FIG. 6 is a top view of a plurality of growing sleds with a shared drainage scheme.

FIG. 6 is a top diagram of the configurable nature of the present invention. Here, there are six sleds 300 arranged together. Each sled 300 has a plurality of plants 41. Each plant 41 is grown in a receptacle 140, in this case a receptacle 140. The sleds 300 each have an individual gutter 60. Each gutter 60 drains into a common gutter 660. The common gutter 660 empties into a drainage basin 661. The sleds 300 have wheels 301, so the invention 1, can be re-configured by simply moving sleds 300. The invention 1 is scalable by adding or subtracting sleds 300 from the system.

The plurality of rectangular growing sleds 300 is designed to be both scalable and re-configurable. A plurality of sleds 300 can be chosen in order to cover any given amount of floor space. In other words, the number of sleds 300 in a plurality of sleds 300 is based on the defined amount of floor space available for placing the plurality of sleds 300. Once a plurality of sleds 300 is placed, a first rectangular growing sled 300 can be rolled on its wheels 301 in order to access a second rectangular growing sled 300. A first rectangular growing sled 300 can be rolled on its wheels 301 in order to harvest a plant 41, or perform maintenance on a plant 41. A first rectangular growing sled 300 can be rolled on its wheels 301 in order to gain access to the first rectangular growing sled 300 and perform maintenance. Of course, the entire plurality of rectangular growing sleds can be re-configured to conform with a new floor space, as well.

I claim:

1. An apparatus for growing a plurality of plants indoors comprising
   a rectangular growing sled comprised of a frame, a corrugated drainage surface, a gutter, four wheels, and a drive mechanism;
   a plurality of plant support assemblies having a planar upper surface; and
   a plurality of forced frames equal in number to the plurality of plant support assemblies;
      wherein each of the plant support assemblies is attached to the rectangular growing sled;
      wherein each of the plant support assemblies has a forced frame attached to the planar upper surface;
      wherein each of the plant support assemblies has a plant-support drive wheel, connected to the drive mechanism, allowing the drive mechanism to rotate the planar upper surface around an axis orthogonal to the planar upper surface; and
      wherein the drive mechanism is comprised of
      a motor;
      a drive shaft;
      a plurality of shaft-mounted drive wheels, equal in number to the plurality of plant support assemblies, connected to, and drivingly engaged with, the drive shaft;
      a plurality of drive-shaft-mounted return wheels, equal in number to the plurality of plant support assemblies, that are free to turn independently of the drive shaft;
      a plurality of tensioner assemblies, equal in number to the plurality of plant support assemblies, comprised of a tensioner body and a tensioner wheel; and
      a plurality of closed-loop drive belts, equal in number to the plurality of plant support assemblies,
         wherein each of the plurality of closed-loop drive belts goes around a shaft-mounted drive wheel, a plant-support drive wheel, a return wheel, and a tensioner wheel;
         wherein each of the plurality of closed-loop drive belts is drivingly engaged with one and only one shaft-mounted drive wheel; and
         wherein each of the plurality of closed-loop drive belts rotates one and only one plant support assembly.

2. The apparatus for growing a plurality of plants indoors in claim 1, further comprising a common irrigation feed hose, attached to the rectangular growing sled.

3. The apparatus for growing a plurality of plants indoors in claim 2, further comprising a plurality of plant-support hoses, equal in number to the plurality of plant support assemblies, each plant-support hose having two ends, the first end of each plant-support hose being connected to the common irrigation feed hose and the second end of each plant support hose terminating in a c-shaped nozzle housing.

4. The apparatus for growing a plurality of plants indoors in claim 3, wherein each plant support assembly is comprised of, from bottom to top, a square attachment plate, a two-piece rotational bearing, a lower spacer plate, plant-support drive wheel, an upper spacer plate, a base plate, and a square plant-support plate.

5. The apparatus for growing a plurality of plants indoors in claim 4, wherein each of the attachment plate, the two-piece rotational bearing, the lower spacer plate, and the plant-support drive wheel have a central hole through which a plant-support hose is routed.

6. The apparatus for growing a plurality of plants indoors in claim 5, wherein the planar upper surface of the plant support assembly is the planar upper surface of the plant-support plate; and wherein the plant-support plate is attached to the base plate with a plurality threaded fasteners.

7. The apparatus for growing a plurality of plants indoors in claim 6,
   wherein the frame of the rectangular growing sled is comprised of two rectangular end side arrangements and two longitudinal members;
   wherein each of the two rectangular end side arrangements is constructed two transverse members and two vertical members;
   wherein each of the two rectangular end side arrangements has an inner surface comprised of an inner surface of a first transverse member, an inner surface of a second transverse member, an inner surface of a first vertical member, and an inner surface of a second vertical member;
   wherein each of the two vertical members has a relative top and bottom;
   wherein, on the inner surface of each of the two rectangular end side arrangements, the inner surface of the first vertical member is disposed opposite the inner surface of the second vertical member; and
   wherein two wheels are attached to the bottom surface of each of the two rectangular end side arrangement, so that the two wheels are disposed distal to one another.

8. The apparatus for growing a plurality of plants indoors in claim 7, in which
   a first end of a first longitudinal member is attached to a first vertical member on the inner surface of the first rectangular end side arrangement, as near to the top of the first vertical member of the first rectangular end side arrangement as possible;
   a second end of the first longitudinal member is attached to a first vertical member on the inner surface of the second rectangular end side arrangement, as near to the top surface of the first vertical member of the second rectangular end side arrangement as possible;
   so that the two rectangular end side arrangements are parallel, separated by the first longitudinal member.

9. The apparatus for growing a plurality of plants indoors in claim 8, in which
   a first end of the second longitudinal member is attached to a second vertical member on the inner surface of the first rectangular end side arrangement, as near to the top of the second vertical member of the first rectangular end side arrangement as possible;
   a second end of the second longitudinal member is attached to a second vertical member of the inner surface of the second rectangular end side arrangement, as near to the bottom of the second vertical member of the second rectangular end side arrangement as possible as possible;
   so that the second longitudinal member is not parallel to the ground plane, but rather has a slope.

10. The apparatus for growing a plurality of plants indoors in claim 9 in which a gutter is attached to the second longitudinal member, so that the gutter has the same slope as the second longitudinal member.

11. The apparatus for growing a plurality of plants indoors in claim 10, wherein the corrugated drainage surface slopes downward towards the gutter because the corrugated drainage surface extends from the first longitudinal member to the gutter, and the gutter shares a slope with the second longitudinal member.

12. The apparatus for growing a plurality of plants indoors in claim 11, wherein the rectangular growing sled is further comprised of two parallel u-channels extending from the first rectangular end side arrangement to the second rectangular end side arrangement.

13. The apparatus for growing a plurality of plants indoors in claim 12, wherein the square attachment plate has a hole near each of its four corners;
   and wherein a connector extends downward, through each of the four corner holes of the square attachment plate.

14. The apparatus for growing a plurality of plants indoors in claim 13, wherein the two u-channels are spaced apart a distance so that a first set of two connectors extending downward from the attachment plate extend into a first u-channel and second set of two connectors extending downward from the attachment plate extend into a second u-channel.

15. The apparatus for growing a plurality of plants indoors in claim 14, wherein each of the connectors extending downward is captured in the u-channel by a c-ring.

16. The apparatus for growing a plurality of plants indoors in claim 14,
   wherein each plant support assembly is further comprised of four threaded fasteners and four capture nuts;
   wherein each of the square plant-support plates has a hole in near proximity to each of its four corners;
   wherein the four threaded fasteners are placed in the four holes of the square plant-support plates so as to have the threads facing upward; and
   wherein each of the four threaded fasteners are secured with a capture nut on the planar upper surface of the square plant-support plate.

17. The apparatus for growing a plurality of plants indoors in claim 16 further comprising a plurality of plants in receptacles, equal in number to the plurality of plant support assemblies, wherein each of the plant-support assemblies has one plant in a receptacle on its planar upper surface, confined by the forced frame.

18. The apparatus for growing a plurality of plants indoors in claim 17, wherein each forced frame is comprised of four forced frame vertical members, two cross members, an upper retaining rim assembly, and filament.

19. The apparatus for growing a plurality of plants indoors in claim 18, wherein the upper retaining rim assembly is comprised of an upper retaining rim, two intersecting spoke, four retention clips, and a center piece.

20. The apparatus for growing a plurality of plants indoors in claim 19,
wherein the upper retaining rim, intersecting spokes, and forced frame vertical members are connected to one another with retention clips; and
wherein the two cross members attach opposing pairs of forced frame vertical members at their approximate mid-point.

21. The apparatus for growing a plurality of plants indoors in claim 20,
wherein the upper retaining rim is the uppermost element of the apparatus.

22. The apparatus for growing a plurality of plants indoors in claim 21,
wherein filament is wrapped around the outside of the forced frame vertical members.

23. The apparatus for growing a plurality of plants indoors in claim 22, wherein each of the forced frames is attached to a plat support assembly by placing the four forced frame vertical members over the four upward protruding threaded fasteners in the planar upper surface of the plant-support plate, thereby creating a plant station.

24. The apparatus for growing a plurality of plants indoors in claim 23,
wherein each rectangular growing sled has a tensioner support beam;
wherein each of the tensioner bodies is attached to the tensioner support beam with two tensioner bands.

25. The apparatus for growing a plurality of plants indoors in claim 24,
wherein each c-shaped nozzle housing has a nozzle, and wherein the c-shaped nozzle housing is shaped to fit over the upper retaining rim allowing each plant station to be independently irrigated.

* * * * *